UNITED STATES PATENT OFFICE.

JOHN M. JAQUES, SR., OF THORNTOWN, INDIANA.

INSECTICIDE MIXTURE.

SPECIFICATION forming part of Letters Patent No. 292,015, dated January 15, 1884.

Application filed September 4, 1883. (No specimens.)

*To all whom it may concern:*

Be it known that I, JOHN M. JAQUES, Sr., a citizen of the United States, residing at Thorntown, in the county of Boone and State of Indiana, have invented a new and useful Compound, of which the following is a specification.

This invention relates to compositions or solutions in which seed-corn or other grain is soaked, so as to be thoroughly impregnated and coated preparatory to planting; and it has for its object to produce a composition which will prevent mice, moles, grub-worms, &c., from eating and thereby destroying the young grain, while it will also prevent rotting of the seed, and when the grain has started to grow the composition will cause a better and more even growth to the corn, besides possessing other advantages, all as hereinafter set forth.

To attain the aforesaid objects, the said invention consists of the following ingredients, in the proportions stated: turpentine, two quarts; coal-oil, one quart; tobacco, four ounces; indigo, one-half ounce.

The above ingredients, in the said proportions, will make one gallon of the mixture, the manner of compounding the same being substantially as follows: I first take the tobacco and indigo and mix the same by a thorough boiling, and then extracting the liquid mixture, which will combine the strength or essence of the tobacco—a very important feature of the mixture. I then place the tobacco solution, coal-oil, and turpentine in a can or jug, shaking the same, so as to thoroughly mix the same, when it is ready to be used on the grain in the manner and for the purpose stated.

In using my mixture or solution I generally place the grain in a pail, pouring the fluid slowly over the same, the grain being stirred at the same time, while the solution will thoroughly penetrate the seed, forming a glazing over the same. This preparation of the grain is attended to in about five minutes, and in a few minutes after it is ready for planting, either in a drill, seed-planter, or through any other agency. This coating of the grain will preserve its strength for a month or more; but of course it is better to plant the seed at once after it has been prepared.

By means of the solution prepared as above the grain does not rot so soon and remains longer on the stalk. It feeds the stalk of the nutriment that is in the grain until the roots are strong enough for the earth to support it, while the taste of the composition remains in the seed, and the stalk while young retains this taste, which is obnoxious to worms, ants, moles, mice, &c., and thus the grain and the young stalk will be saved from being destroyed by the ravages of such insects and small animals.

It will be apparent that the composition can be used on peas, wheat, or other seeds and grain, and produce the effect as stated.

The composition is cheap, is readily prepared and applied to the grain, while the benefits derived from its use will more than repay the slight trouble in its application.

I do not limit myself to the specific proportions stated, as they may be varied at pleasure.

Having described my invention, I claim as new—

A seed-protecting compound consisting of coal-oil, turpentine, tobacco, and indigo, in the proportions substantially as set forth.

In testimony that I claim the foregoing as my own I have hereto affixed my signature in presence of two witnesses.

JOHN M. JAQUES, SR.

Witnesses:
 WASH GRIFFIN,
 JAMES R. LINCH.